United States Patent
Chen

(10) Patent No.: US 9,415,634 B2
(45) Date of Patent: Aug. 16, 2016

(54) BICYCLE HUB WITH PROTECTIVE STRUCTURE

(71) Applicant: Fu-Sheng Chen, Taichung (TW)

(72) Inventor: Fu-Sheng Chen, Taichung (TW)

( * ) Notice: Subject to any disclaimer, the term of this patent is extended or adjusted under 35 U.S.C. 154(b) by 135 days.

(21) Appl. No.: 14/462,570

(22) Filed: Aug. 19, 2014

(65) Prior Publication Data

US 2016/0052338 A1 Feb. 25, 2016

(51) Int. Cl.
*B60B 27/00* (2006.01)
*B60B 27/04* (2006.01)
*B60B 27/02* (2006.01)

(52) U.S. Cl.
CPC ............. *B60B 27/047* (2013.01); *B60B 27/023* (2013.01)

(58) Field of Classification Search
CPC .... B60B 27/023; B60B 27/04; B60B 27/047; F16D 1/06
USPC .................. 301/110.5, 6.9; 403/359.1, 359.6; 192/64, 70.2; 474/152, 902
See application file for complete search history.

(56) References Cited

U.S. PATENT DOCUMENTS

| | | | | |
|---|---|---|---|---|
| 3,191,735 | A * | 6/1965 | Wavak | F16D 13/683 192/110 R |
| 6,248,437 | B1 * | 6/2001 | Hayashi | B82Y 30/00 428/328 |
| 6,705,946 | B2 * | 3/2004 | Bridges | F16D 1/02 403/359.1 |
| 8,371,660 | B2 | 2/2013 | Shook | |
| 8,801,109 | B2 * | 8/2014 | Tho | B60B 27/0047 301/110.5 |
| 8,974,140 | B2 * | 3/2015 | Durling | F16D 1/033 403/357 |
| 2008/0315679 | A1 * | 12/2008 | Shook | B60B 27/026 301/110.5 |
| 2009/0066152 | A1 * | 3/2009 | You | B60B 27/04 301/106 |
| 2011/0175433 | A1 * | 7/2011 | Chiang | B60B 27/023 301/110.5 |
| 2011/0193406 | A1 * | 8/2011 | Chiang | B60B 27/023 301/110.5 |
| 2012/0139327 | A1 * | 6/2012 | Chen | B60B 27/047 301/110.5 |
| 2013/0076112 | A1 | 3/2013 | Tho | |

\* cited by examiner

*Primary Examiner* — Kip T Kotter

(57) ABSTRACT

A bicycle hub with protective structure includes a hub cassette and at least one protective member. The hub cassette has a driving portion and a shell portion connected to the driving portion. The shell portion has a plurality of ribs integrally formed on an outer periphery of the shell portion and extending axially. The protective member is made of harder material than that of the ribs. The protective member has a U-shaped cross section and defines a top wall and two side walls. The top wall and the two side walls define an engaging groove. Specifically, an inner angle of the engaging groove between the top wall and each of the side walls is an acute angle originally. Each of the two side walls of the protective member is flexible relative to the top wall of the protective member so as to clamp two lateral walls of the associated rib.

5 Claims, 10 Drawing Sheets

BICYCLE HUB WITH PROTECTIVE STRUCTURE

BACKGROUND OF THE INVENTION

1. Field of the Invention

The present invention relates to a bicycle hub, and more particularly to a protective structure for a bicycle hub.

2. Description of Related Art

Generally, a hub cassette 7 has a plurality of ribs 71 on the outer periphery of the hub cassette 7 for engagement with a sprocket 8, as shown in FIG. 9. The sprocket 8 is mounted around the hub cassette 7 and retained by the ribs 71. However, the ribs 71 may be worn easily for continuous riding since the sprocket 8 are generally harder than the ribs 71. At the same time, each rib 71 would be worn to produce a notch 72 which causes the sprocket 8 not to drive a bicycle hub effectively.

In order to solve the above problem, a conventional bicycle hub further comprises a metal sheet 9 attached to the rib 71, as shown in FIG. 10. Wherein, the rib 71 has a recess 73 in a top thereof for accommodating the metal sheet 9. The metal sheet 9 is harder than the sprocket 8. The metal sheet 9 is fixed to the rib 71 by a plurality of screws 10 so as to reinforce the structure of the hub cassette 7. However, the configuration of the recess 73 will increase manufacturing cost and the screws 10 may be loosened during riding.

Another type of bicycle hub is illustrated in U.S. Pub. No. 2013/0076112. In this bicycle hub, a driving socket has a plurality of ribs extending axially on the outer surface thereof and at least one protection unit located between two of the ribs and has an engaging portion. A cover is engaged with the engaging portion and has a cover face and two sidewalls to form an engaging groove. Specifically, the engaging portion has two transmission surfaces respectively located on two sides thereof and each transmission surface is gradually tapered toward the center of the driving socket. Each of the two sidewalls of the cover has an inclined surface corresponding to the respective transmission surface of the engaging portion for engagement between the engaging groove of the cover and the engaging groove. Furthermore, two sides of the engaging portion each has a positioning slot in the outer surface of the driving socket, wherein each sidewall of the cover has an extension engaged with the positioning slot to increase the contact area between the cover and the engaging portion. However, the configurations of the transmission surface and the positioning slot of the engaging portion will reduce the strength of the driving socket. Besides, the manufacturing processes of the engaging portion and the cover will increase manufacturing cost.

The present invention has arisen to mitigate and/or obviate the disadvantages of the conventional bicycle hub.

SUMMARY OF THE INVENTION

The main objective of the present invention is to provide an improved bicycle hub.

To achieve the objective, a bicycle hub comprises a hub cassette and at least one protective member. The hub cassette has a driving portion and a shell portion connected to the driving portion. The shell portion has a plurality of ribs integrally formed on the outer periphery of the shell portion and extending axially from one end of the shell portion to the other end of the shell portion. The protective member is made of harder material than that of the ribs. The protective member is attached to at least one of the ribs of the shell portion. The protective member has a U-shaped cross section and defines a top wall and two side walls extending from the bottom of the top wall. The top wall and the two side walls define an engaging groove. Specifically, an inner angle of the engaging groove between the top wall and each of the side walls is an acute angle originally. Wherein each of the two side walls of the protective member is flexible relative to the top wall of the protective member such that the two side walls of the protective member clamp two lateral walls of the associated rib.

Another object in accordance with the present invention is the provision of a method for manufacturing the bicycle hub above.

The method comprises the steps of (a). cutting a solid rod into a plurality of rod pieces; (b). molding each of the rod pieces into a semi-product by a mold, wherein the semi-product has a driving portion, a shell portion, and a plurality of ribs integrally formed on the outer periphery of the shell portion; (c). removing excess material of the semi-product to form a hollow structure; (d). anodizing the surface of the semi-product to form a final product; and (e). attaching at least one protective member to a related one of the ribs of the shell portion, the protective member made of harder material than that of the ribs and having a U-shaped cross section and defining a top wall and two side walls extending from the bottom of the top wall, the top wall and the two side walls defining an engaging groove, wherein an inner angle of the engaging groove between the top wall and each of the side walls being an acute angle originally, and the two side walls of the protective member are flexible to clamp two lateral walls of the associated rib.

Preferably, in step (e), an installation of the protective member is manual, semi-automatic or fully automatic. Moreover, in step (c), the hollow structure of the semi-product defines an assembling hole therethrough from the shell portion to the driving portion axially.

Further benefits and advantages of the present invention will become apparent after a careful reading of the detailed description with appropriate reference to the accompanying drawings.

DETAILED DESCRIPTION OF THE INVENTION

Figure 1:
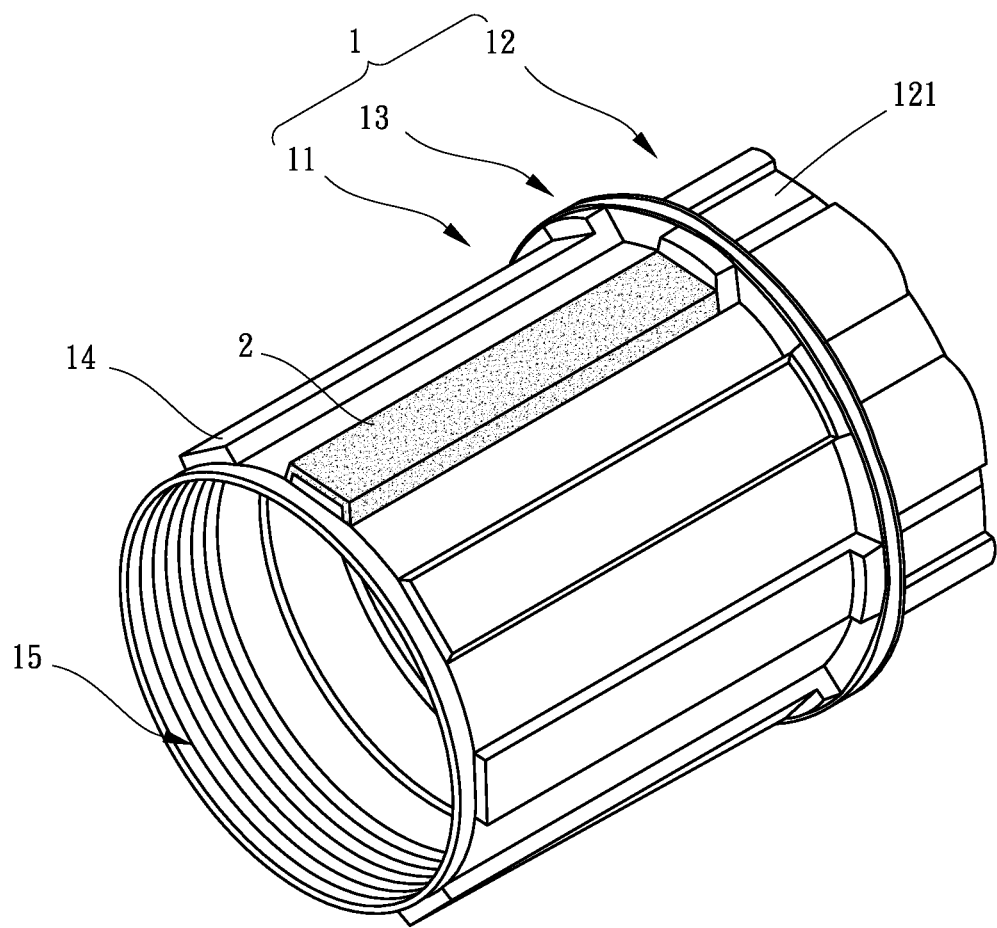
FIG. 1 is a perspective view of a bicycle hub with a protective member in accordance with a preferred embodiment of the present invention.
Figure 2:
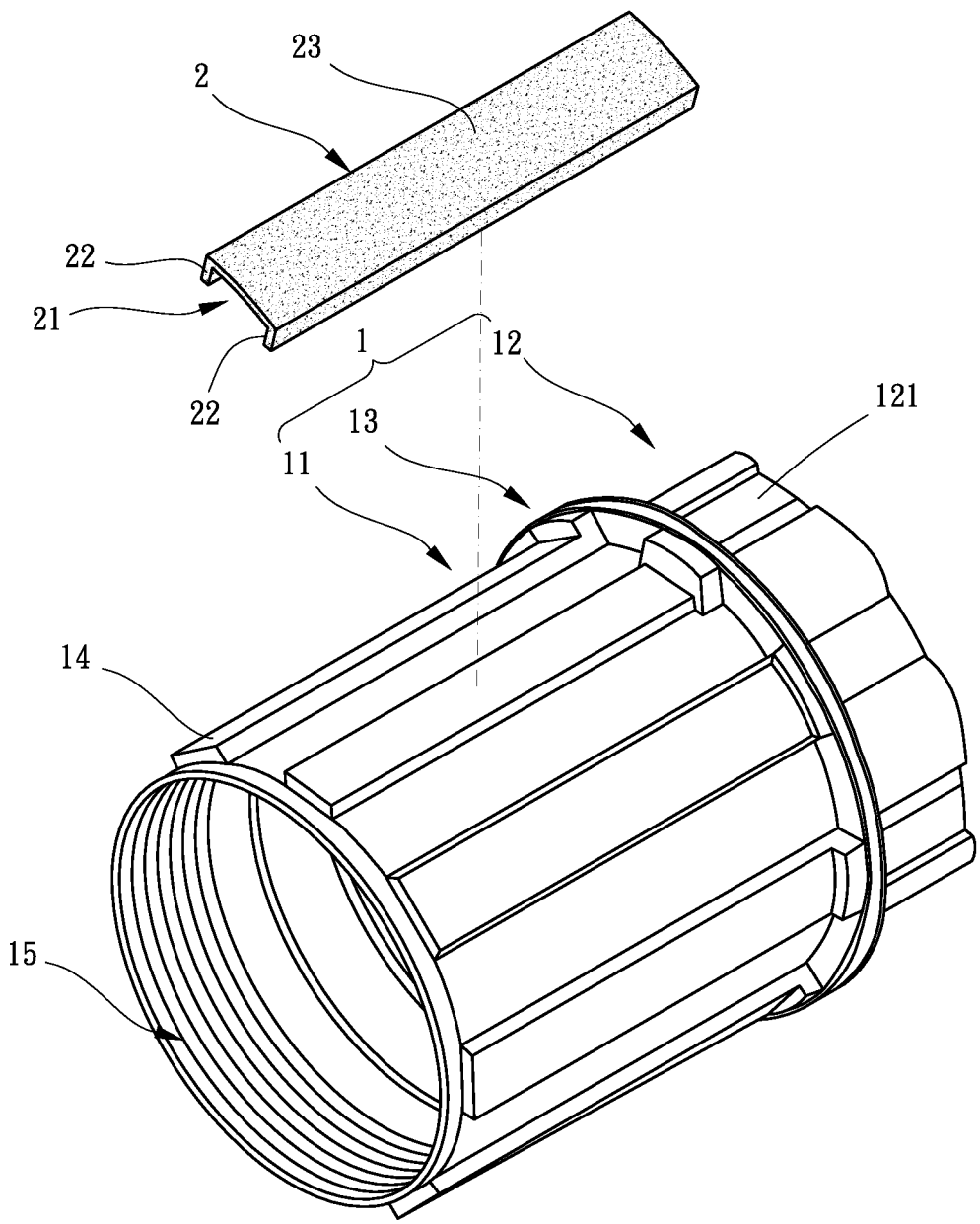
FIG. 2 is an exploded perspective view of the bicycle hub shown in FIG. 1.
Figure 3:
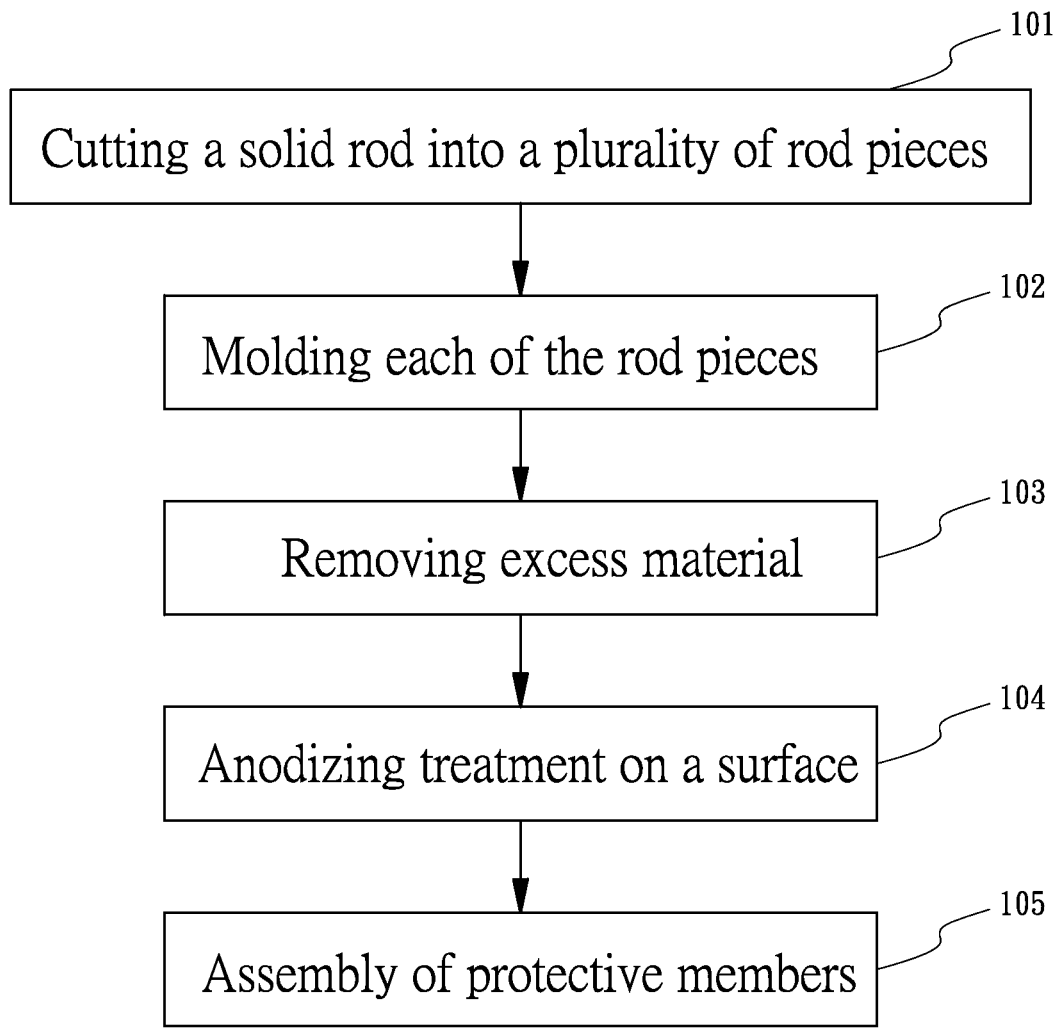
FIG. 3 is a flow chart of a manufacturing process of the bicycle hub of the present invention.
Figure 4:
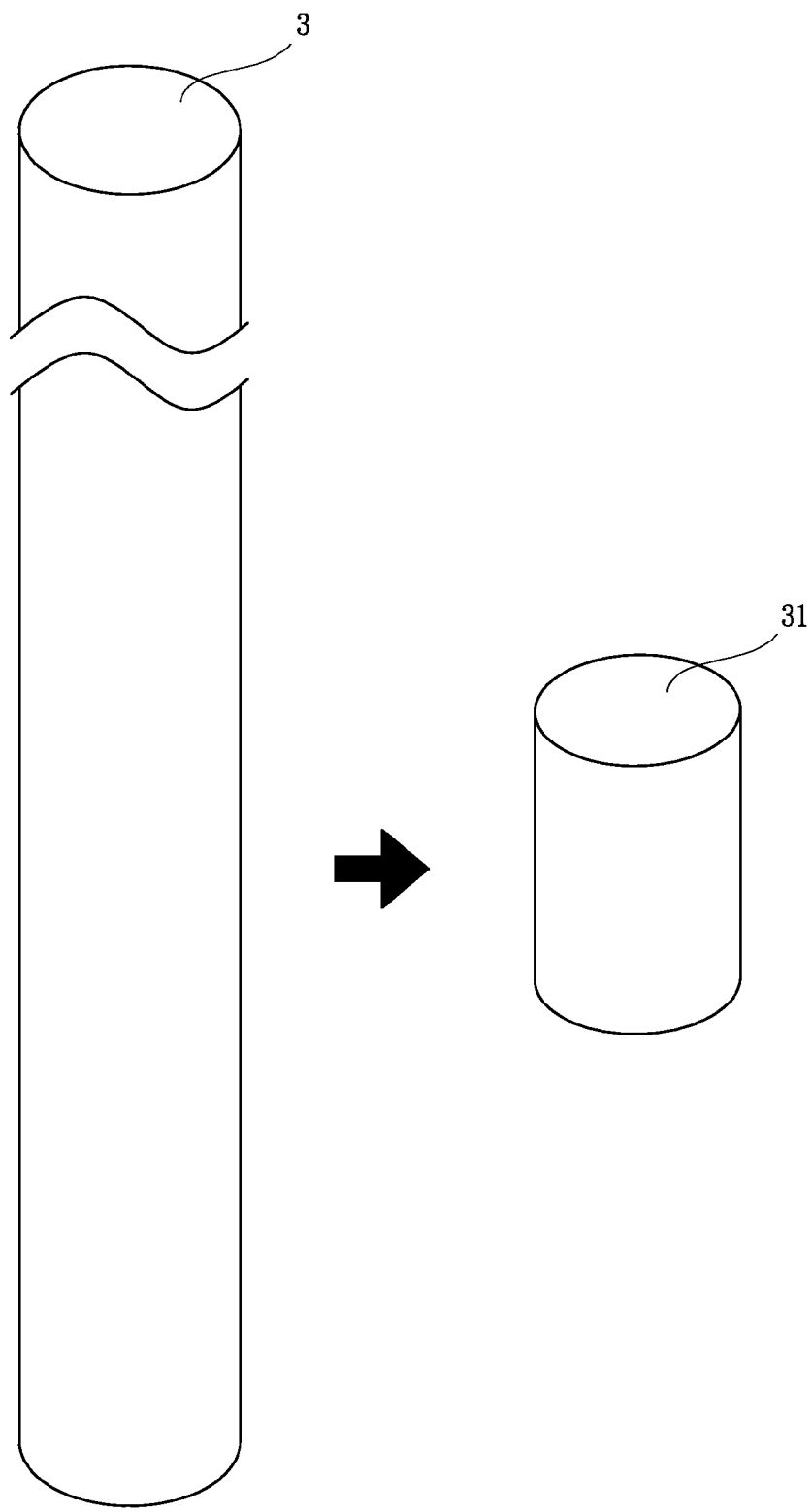
FIG. 4 illustrates a material preparing step of the bicycle hub of the present invention.
Figure 5:
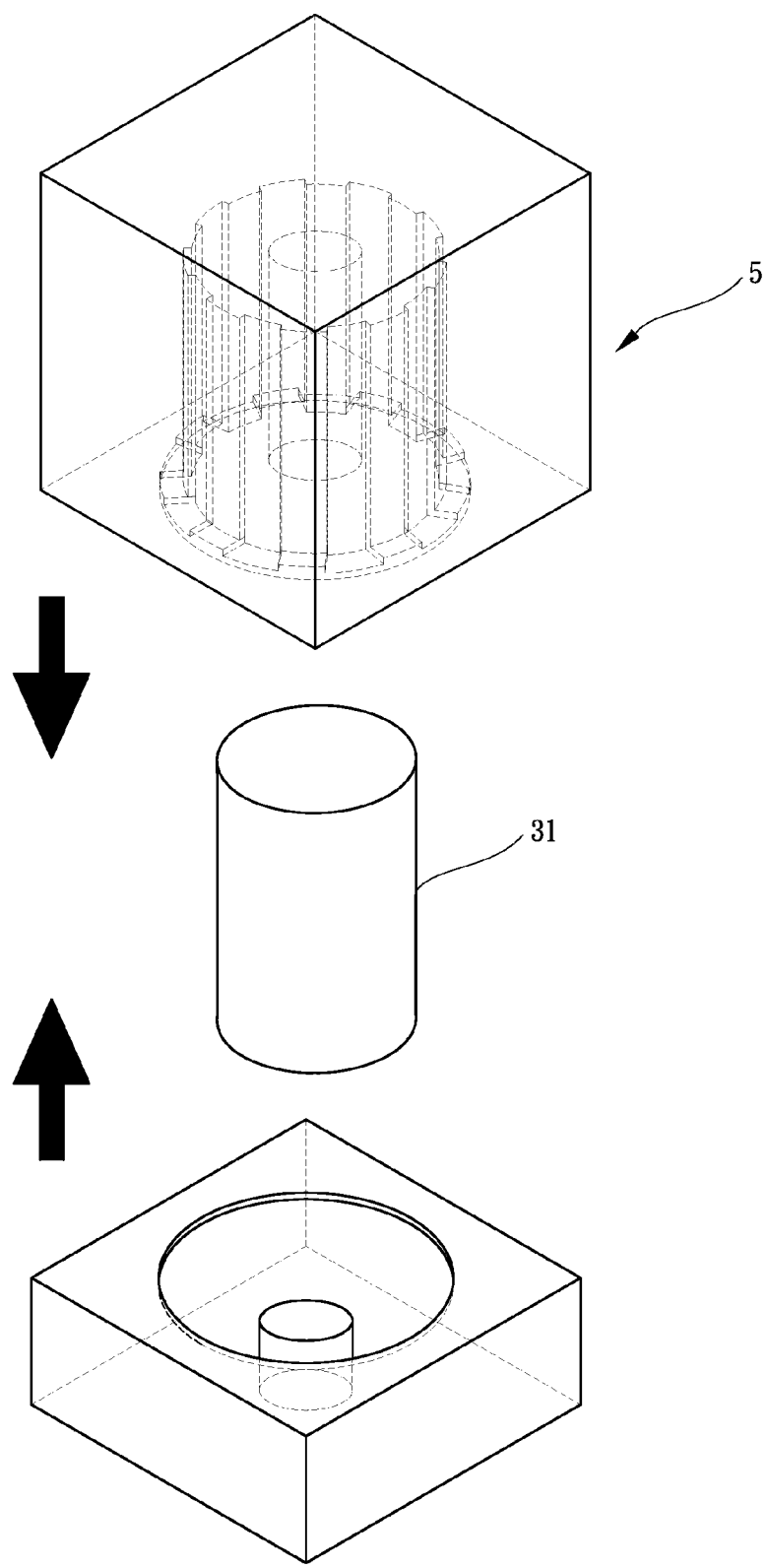
FIG. 5 illustrates a molding step of the bicycle hub of the present invention.
Figure 6:
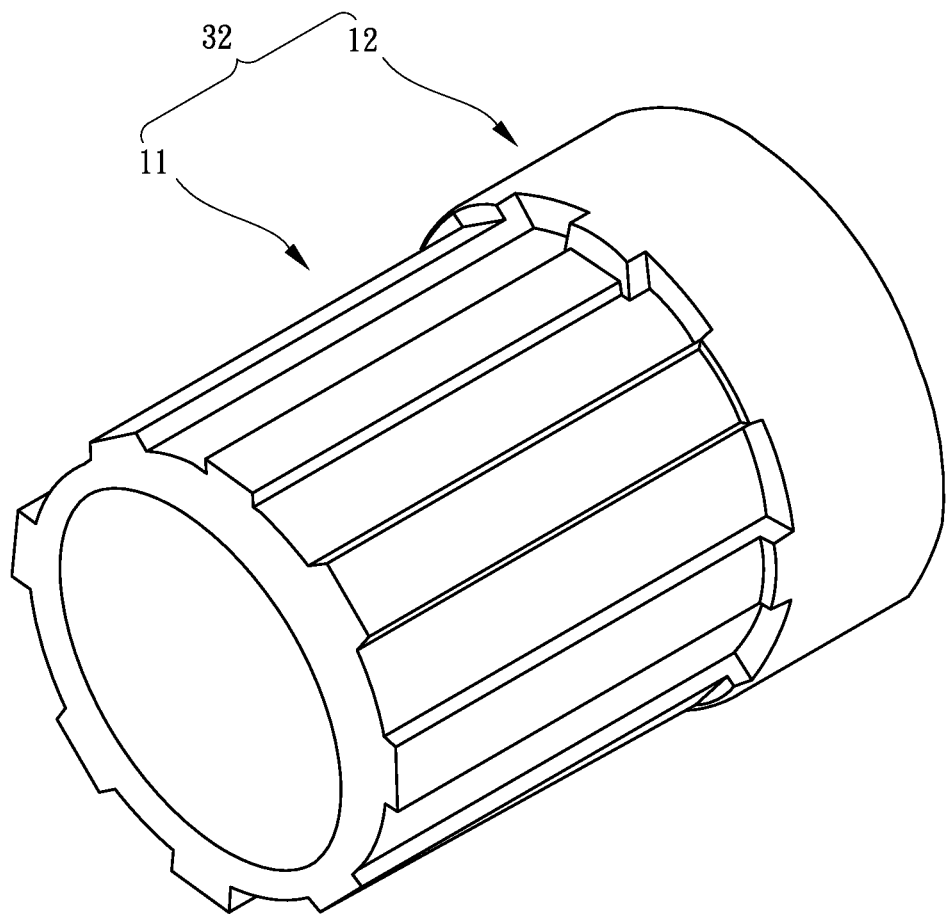
FIG. 6 is a perspective view of a semi-product from the molding step in FIG. 5.

Referring to FIGS. 1-2, a bicycle hub in accordance with a preferred embodiment of the present invention comprises a hub cassette 1 and at least one protective member 2.

The hub cassette 1 has a driving portion 12, a shell portion 11 connected to the driving portion 12 and a flange 13 defined between the shell portion 11 and the driving portion 12. The driving portion 12 of the hub cassette 1 has a plurality of recesses 121 defined around the outer periphery thereof. The shell portion 11 has a plurality of ribs 14 integrally formed on the outer periphery of the shell portion 11 and extending axially from one end of the shell portion 11 to the other end of the shell portion 11. The protective member 2 is made of harder material than that of sprockets and the hub cassette 1, especially the ribs 14. The protective member 2 is attached to at least one of the ribs 14 of the shell portion 11. The protective member 2 has a U-shaped cross section and defines a top wall 23 and two side walls 22 extending from the bottom of the top wall 23. The top wall 23 and the two side walls 22 form an engaging groove 21.

Specifically, an inner angle of the engaging groove 21 between the top wall 23 and each of the side walls 22 is an acute angle originally, wherein each of the two side walls 22 of the protective member 2 is flexible relative to the top wall 23 of the protective member 2 such that the two side walls 22 of the protective member 2 clamp two lateral walls of the associated rib 14. In this manner, the protective member 2 is fitted on the associated rib 14, and the inner angle between the top wall 23 and each side wall 22 is consistent with the angle of the associated rib 14 finally. In the embodiment of the present invention, the angle between the top wall 23 and each side wall 22 is changed to a right angle.

Moreover, the number of the protective member 2 is not limited in the present invention. For instance, the bicycle hub could further comprises another two protective members 2 such that the three protective members 2 are attached to the ribs 14 of the shell portion 11. Furthermore, the hub cassette 1 is hollow cylindrical in shape which defines an assembling hole 15 therethrough.

Referring to FIGS. 3-8, a method of manufacturing above bicycle hub is described below. The method comprises the steps of:

In step 101, a solid rod 3 is cut into a plurality of rod pieces 31, firstly.

In step 102, each of the rod pieces 31 is molded into a semi-product 32 by a mold 5, wherein the semi-product 32 is formed with a driving portion 12, a shell portion 11, and a plurality of ribs 14 integrally formed on the outer periphery of the shell portion 11.

In step 103, excess material of the semi-product 32 is removed to form a hollow structure which defines an assembling hole 15 therethrough from the shell portion 11 to the driving portion 12 axially.

In step 104, a surface of the semi-product 32 is anodized to form a final product.

Finally, in step 105, at least one protective member 2 is attached to a related one of the ribs 14 of the shell portion 11.

Figure 7:
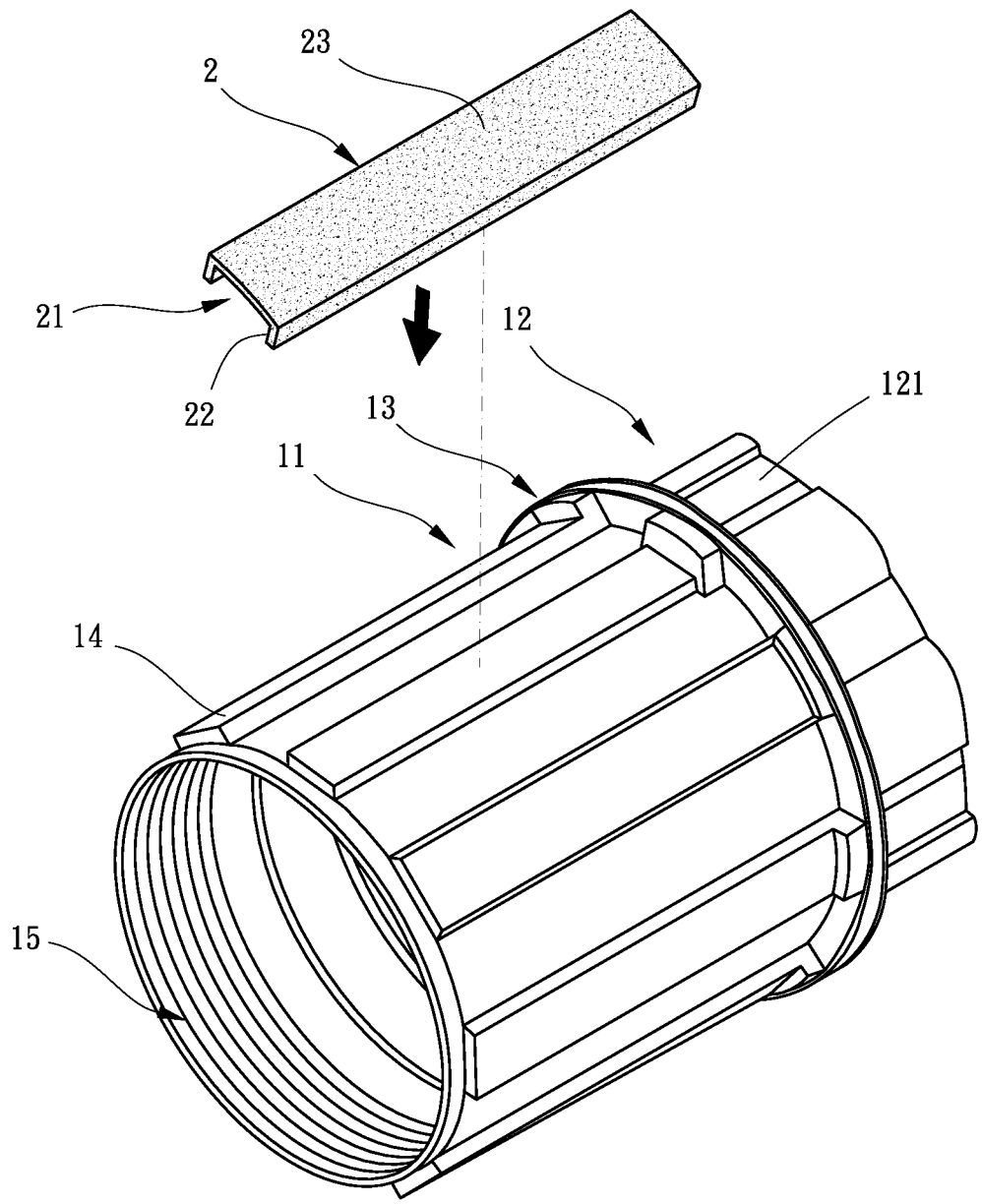
FIG. 7 illustrates at least one protective member attached to the shell portion of the present invention.
Figure 8:
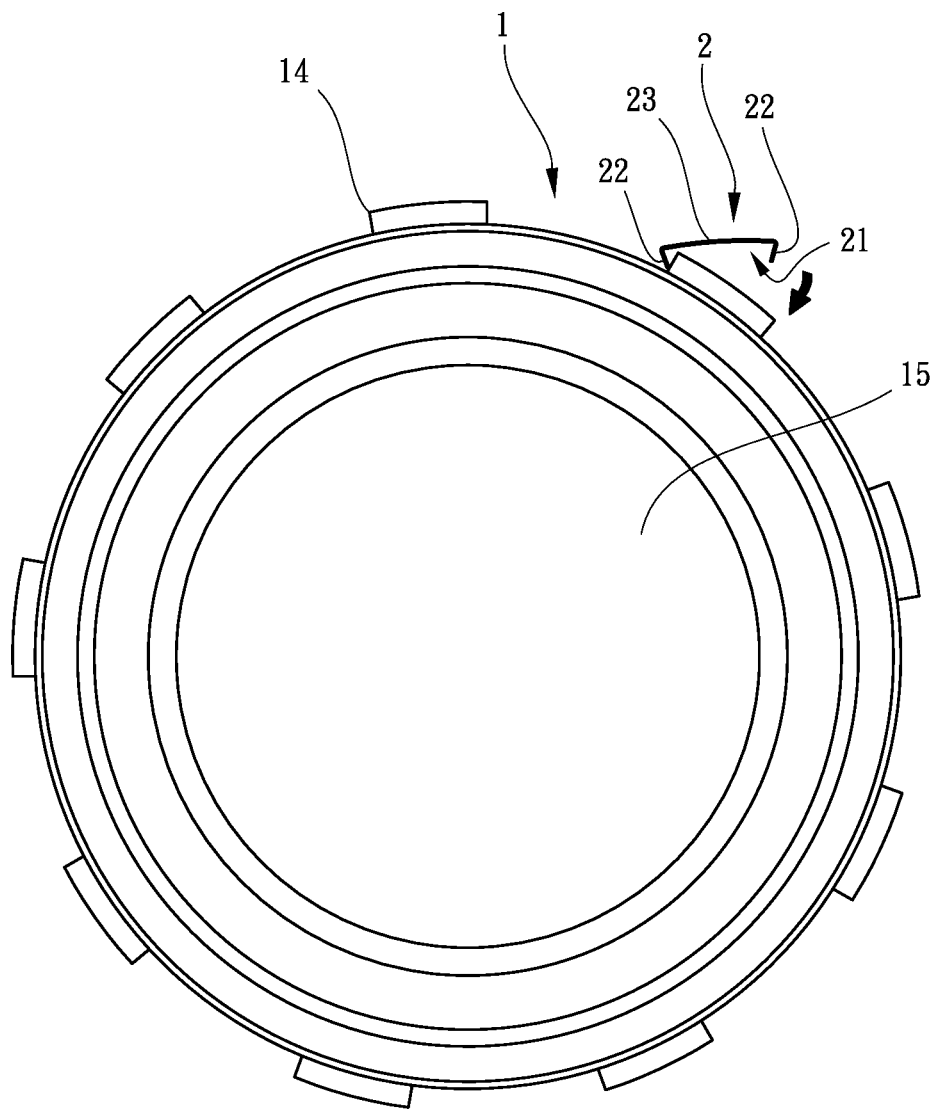
FIG. 8 is a side view for showing the protective member attached to the shell portion of the present invention.
Figure 9:
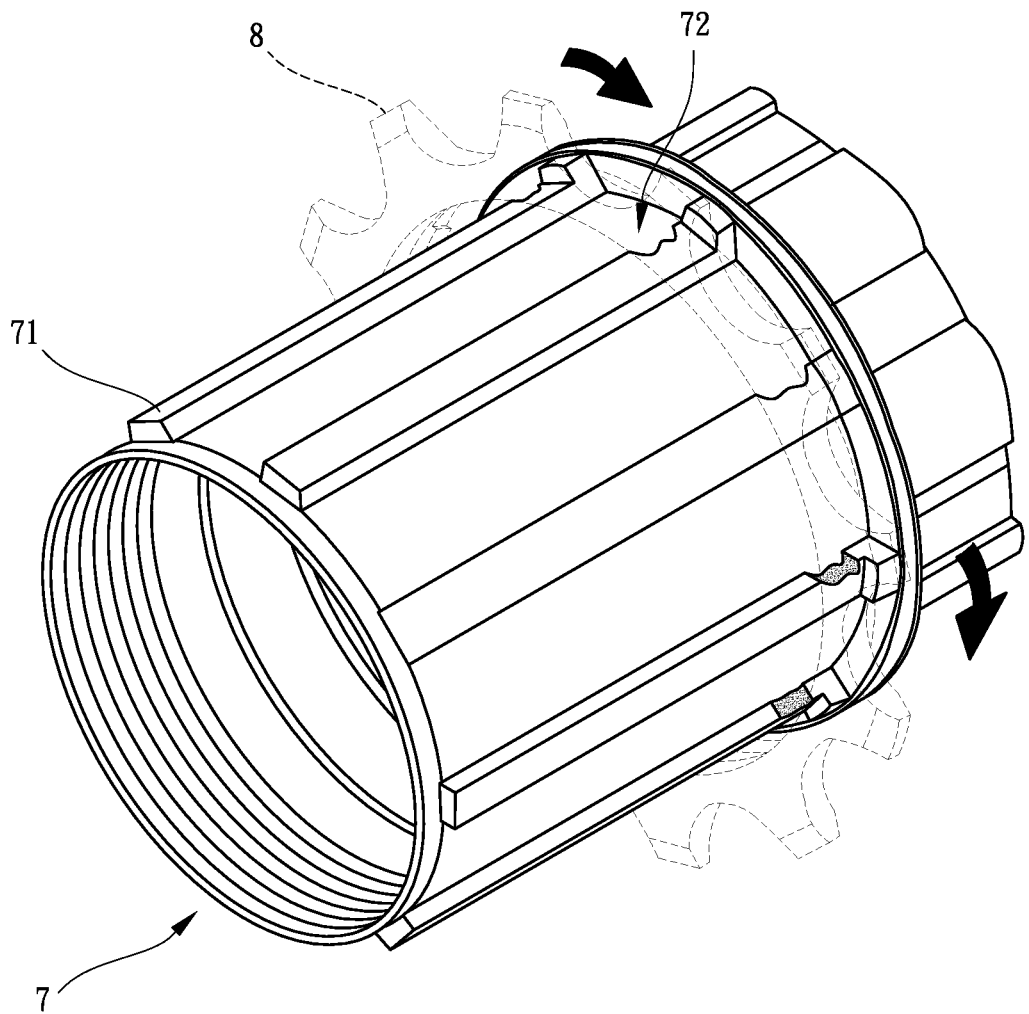
FIG. 9 is prior art.
Figure 10:
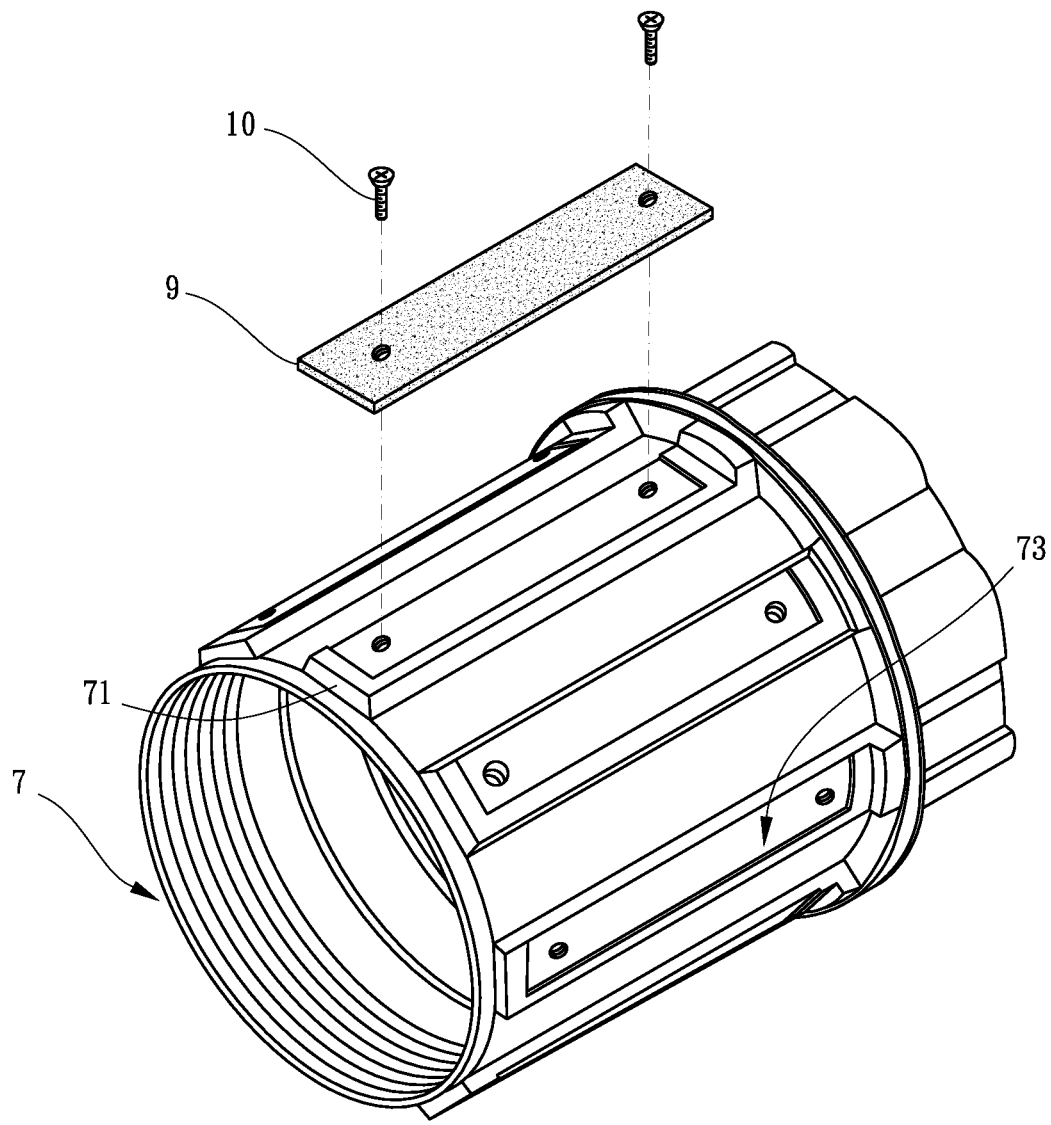
FIG. 10 is another prior art.

As mentioned previously, the two side walls 22 of the protective member 2 are flexible relative to the top wall 23. FIGS. 7-8 illustrate the operation of the protective member 2. Firstly, the protective member 2 is leaned against one lateral wall of the associated rib 14 with one of the two side walls 22, and then the other side wall 22 is bent to buckle the opposite lateral wall of the associated rib 14 such that the protective member 2 clamps the associated rib 14 to retain on the hub cassette 1. In this manner, the inner angle between the top wall 23 and each side wall 22 is consistent with the angle of the associated rib 14. Particularly, the protective member 2 could be attached to the associated rib 14 by further adhesive. In addition, the installation of the protective member 2 could be manual, semi-automatic or fully automatic.

Although embodiments of this invention have been fully described with reference to the accompanying drawings, it is to be understood that various modifications can be made by those skilled in the art without departing from the scope of the invention as hereinafter claimed.

What is claimed is:

1. A bicycle hub, comprising:
   a hub cassette having a driving portion and a shell portion connected to the driving portion, the shell portion having a plurality of ribs integrally formed on an outer periphery of the shell portion and extending axially from one end of the shell portion to the other end of the shell portion; and
   at least one protective member made of harder material than that of the ribs, the protective member attached to at least one of the ribs of the shell portion, the protective member having a U-shaped cross section and defining a top wall and two side walls extending from a bottom of the top wall, the top wall and the two side walls defining an engaging groove, an inner angle of the engaging groove between the top wall and each of the side walls being an acute angle originally;
   wherein each of the two side walls of the protective member is flexible relative to the top wall of the protective member such that the two side walls of the protective member clamp the associated rib.

2. The bicycle hub as claimed in claim 1, wherein the hub cassette is hollow cylindrical in shape which defines an assembling hole therethrough.

3. A method of manufacturing a bicycle hub, comprising the steps of:
   (a). cutting a solid rod into a plurality of rod pieces;
   (b). molding each of the rod pieces into a semi-product by a mold, wherein the semi-product has a driving portion, a shell portion, and a plurality of ribs integrally formed on an outer periphery of the shell portion;
   (c). removing excess material of the semi-product to form a hollow structure;
   (d). anodizing a surface of the semi-product to form a final product; and
   (e). attaching at least one protective member to a related one of the ribs of the shell portion, the protective member made of harder material than that of the ribs and having a U-shaped cross section and defining a top wall and two side walls extending from a bottom of the top wall, the top wall and the two side walls defining an engaging groove, wherein an inner angle of the engaging groove between the top wall and each of the side walls being an acute angle originally, and the two side walls of the protective member are flexible to clamp the associated rib.

4. The method of manufacturing the bicycle hub as claimed in claim 3, wherein in step (e), an installation of the protective member is manual, semi-automatic or fully automatic.

5. The method of manufacturing the bicycle hub as claimed in claim 3, wherein in step (c), the hollow structure of the semi-product defines an assembling hole therethrough from the shell portion to the driving portion axially.

\* \* \* \* \*